United States Patent
Baba et al.

[11] Patent Number: 5,224,399
[45] Date of Patent: Jul. 6, 1993

[54] CONTROL SYSTEM FOR AUTOMATIC TRANSMISSION

[75] Inventors: Fumiaki Baba; Masahito Kitada; Hiroshi Yoshimura, all of Hiroshima, Japan

[73] Assignee: Mazda Motor Corporation, Hiroshima, Japan

[21] Appl. No.: 824,544

[22] Filed: Jan. 23, 1992

[30] Foreign Application Priority Data

Jan. 23, 1991 [JP] Japan .................................. 3-22869
Mar. 29, 1991 [JP] Japan .................................. 3-67077

[51] Int. Cl.5 ............................................ F16H 61/00
[52] U.S. Cl. ................................... 74/867; 74/868; 192/109 F
[58] Field of Search ................. 74/869, 868, 867; 192/109 F

[56] References Cited

U.S. PATENT DOCUMENTS

| | | | |
|---|---|---|---|
| 3,744,348 | 7/1973 | Lemon | 192/109 F |
| 4,485,695 | 12/1984 | Kawamoto | 74/868 X |
| 4,817,474 | 4/1989 | Morisawa | 74/868 X |
| 5,092,201 | 3/1992 | Hayakawa et al. | 74/867 |
| 5,115,696 | 5/1992 | Takada et al. | 74/867 X |

FOREIGN PATENT DOCUMENTS 57-52426 11/1982 Japan .
63-186055 8/1988 Japan .

Primary Examiner—Richard M. Lorence
Assistant Examiner—Khoi Q. Ta
Attorney, Agent, or Firm—Keck, Mahin & Cate

[57] ABSTRACT

A control system for an automatic transmission includes a main hydraulic line to which hydraulic pressure is introduced when a manual valve takes a reverse range position for reverse movement. First and second hydraulic lines are separated from the main hydraulic line, a first frictional element is connected with the first hydraulic line, and a second frictional element is connected with the second hydraulic line. An accumulator is disposed on the second hydraulic line, a shift valve is disposed on the second hydraulic line closer to the second frictional element than the accumulator, and a first drain port is formed on the manual valve for draining hydraulic fluid from the main hydraulic line when the manual valve is shifted from the reverse range to another range. A spool is disposed in the shift valve for moving to a position to shift the shift valve so that the second line is interrupted by the shift valve and divided between a second frictional element line and an accumulator line. A second drain port is formed in the shift valve for draining the hydraulic fluid in the second frictional element line when the spool moves to the position where the shift valve interrupts the second hydraulic line between the second frictional element line and the accumulator line. A shift shock can be suppressed in a shifting operation involving the reverse range.

9 Claims, 5 Drawing Sheets

FIG. 4

| RANGE | REVERSE CLUTCH | LOW REVERSE BRAKE |
|---|---|---|
| P | | |
| R | O (SOLENOID VALVE 27: CLOSE) | O |
| N | | |
| D | | |

⟨ O: ENGAGE ⟩

CONTROL SYSTEM FOR AUTOMATIC TRANSMISSION

BACKGROUND OF THE INVENTION

1. Field of the Invention

The present invention relates to a shift control system for an automatic transmission.

2. Description of Related Art

In an automatic transmission for an automotive vehicle, generally, as shown in FIG. 6 the transmission is provided with reverse clutch 1 and low reverse brake 2 as frictional elements, which are brought into engagement with each other so as to obtain a rear shift stage for rearward movement. Such an automatic transmission is disclosed in Japanese Patent Public Disclosure (JP A) No. 63-186055, laid open to the public in 1988. Generally, the low reverse brake 2 is provided with a dish plate, as disclosed in Japanese Utility Model Publication (JU Y) No. 57-52426, published in 1982. The dish plate suppresses an undue pressure increase in the low reverse brake 2. The automatic transmission is provided with a main hydraulic line 5 into which a hydraulic pressure is introduced when a manual valve 4 takes a reverse position. The main hydraulic line 5 is divided into a first line 6 and a second line 7. In this case, the first line is connected with the reverse clutch 1 while the second line 7 is connected with the low reverse brake 2.

Accumulator 8 is disposed on either the first line 6 or the second line 7. In this structure, the hydraulic pressure is directly supplied to one of the frictional elements, for instance, low reverse brake 2, to accomplish a quick engagement, but indirectly supplied to the other of the frictional elements, for instance, reverse clutch 1 through the accumulator 8 to make a gradual engagement and to thereby prevent a shift shock.

On the other hand, when the manual valve 4 is switched to another range, such as the N-range, the hydraulic fluids in the frictional elements 1 and 2 are drained through drain port 4a of the manual valve 4 to release the frictional elements 1 and 2.

However, when the hydraulic fluids in both the frictional elements 1 and 2 are drained through the drain port 4a, the hydraulic fluid reserved in the accumulator 8 is also drained because the accumulator 8 is disposed on the hydraulic line which is communicated with the one frictional element. As a result, releasing timing of the one frictional element is delayed.

In other words, the other frictional element 2 is released prior to the one frictional element. When the reverse stage is established, the power transmitting unit, which includes the engine and transmission integrally connected to each other, transmits driving torque to the wheels for reverse movement. The power transmitting unit is subjected to a reactive force from the wheels to deform engine mount members. When the other frictional element is released as a so that the two frictional element is released at different timings when the reverse range is switched for another range, the power transmitting unit is made free from the dampings action of the engine mount members so that the power transmitting unit is shaken due to the resilient return action of the engine mount members. This is called a shift shock.

SUMMARY OF THE INVENTION

It is, therefore, an object of the present invention to provide a control system for an automatic transmission in which a reverse range is smoothly released.

It is another object of the present invention to prevent a shift shock when frictional elements are properly released to switch the reverse range to another range.

It is a still further object of the present invention to readily control draining timings of two frictional elements which establish the reverse range when engaged.

It is yet another object of the present invention to promptly supply hydraulic pressure to a frictional element when the R range is switched to the N range.

The above and other object of the present invention can be accomplished by a shift control system for an automatic transmission including a main hydraulic line to which hydraulic pressure is introduced when a manual valve takes a reverse range for reverse movement, first and second hydraulic lines separated from the main hydraulic line, a first frictional element connected with the first hydraulic line, and a second frictional element connected with the second hydraulic line. An accumulator is disposed on the second hydraulic line, a shift valve is disposed on the second hydraulic line closer to the second frictional element than the accumulator, and a first drain port is formed on the manual valve for draining hydraulic fluid from the main hydraulic line when the manual valve is shifted from the reverse range to another range. A spool is movably disposed in the shift valve for movement to a position to shift the shift valve so that the second line is interrupted by the shift valve and divided between a second frictional element line and an accumulator line. A second drain port is formed in the shift valve for draining the hydraulic fluid in the second frictional element line when the spool moves to the position where the shift valve interrupts the second hydraulic line between the second frictional element line and the accumulator line. Particularly, the hydraulic fluid in the first frictional element is drained through a drain path provided independently from that for the second frictional element. The hydraulic fluid in the first frictional element is drained through the manual valve, and the hydraulic fluid in the accumulator is drained through the manual valve.

According to the above structure, when the hydraulic fluid is drained from the first and second frictional elements, the hydraulic fluid of the first frictional element is drained through the first drain port and the hydraulic fluid in the accumulator is also drained through the first drain port. On the other hand, the hydraulic fluid in the second frictional element is drained through the second drain port.

According to another aspect of the present invention, when a predetermined time period has passed after the manual valve has been switched to a neutral range, the shift valve is switched for providing the reverse range.

The predetermined time period is made long enough to drain the hydraulic fluid in the second frictional element and the accumulator. In this case, the predetermined time period starts when the manual valve is switched from the reverse range to the neutral range. The spool moves so as to switch the shift valve between a supply position, in which the hydraulic pressure of the main hydraulic line is introduced into the second frictional element, and a drain position in which the hydraulic fluid in the second frictional element is drained.

Preferably, the spool is controlled by means of a solenoid which controls a pilot pressure of the shift valve.

Further objects, features and advantages of the present invention will become apparent from the Detailed Description of Preferred Embodiments which follows when read in light of the accompanying Figures.

BRIEF DESCRIPTION OF THE DRAWINGS

FIG. 4 is a table showing a relationship between shift ranges and operation of frictional elements;

DETAILED DESCRIPTION OF THE PREFERRED EMBODIMENTS

Figure 1:
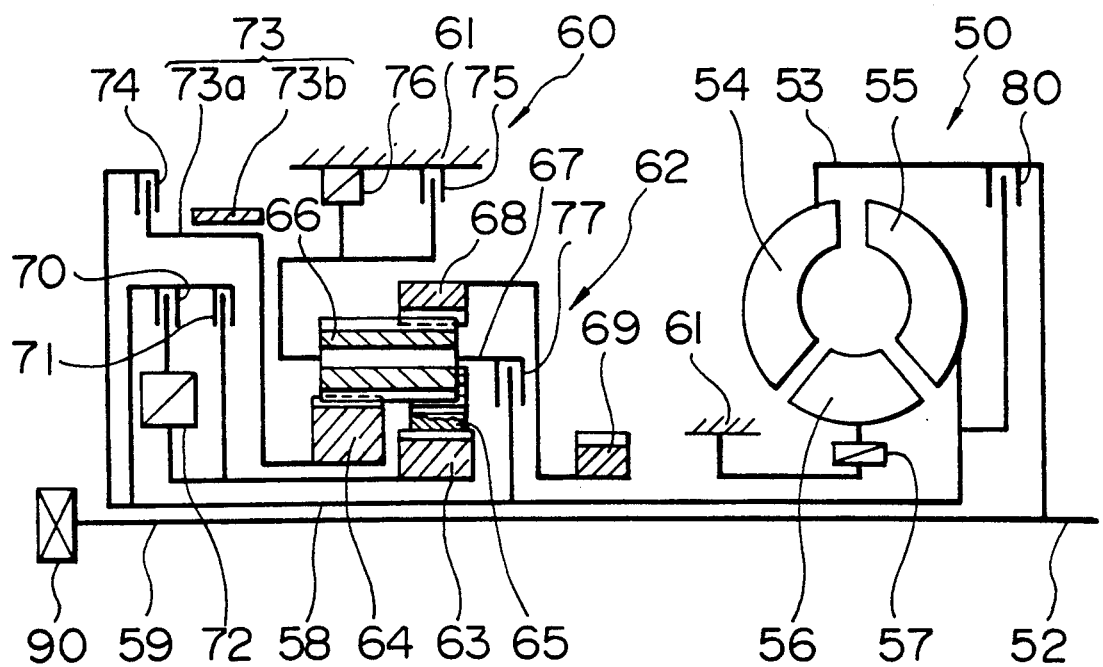
FIG. 1 is a schematic view of an automatic transmission in which the present invention can be incorporated.

Referring specifically to FIG. 1, which is a schematic view of an automatic transmission, the automatic transmission includes a torque converter 50 and a multiple stage transmission gear mechanism 60 for establishing selectively a shift gear stage among plural stages of different speed ratios.

The torque converter 50 is provided with a pump 54 on a case connected with an engine output shaft 52, a turbine 55 disposed facing the pump 54 and driven by the pump 54 through a hydraulic fluid, and a stator 56 disposed between the pump 54 and the turbine 55 and supported by a transmission casing 61 through one-way clutch 57 for making a torque amplifying operation. Rotation of the turbine 55 is transmitted to the gear mechanism 60 through a tubrine shaft 58. The torque converter 50 is further provided with a lock-up clutch 80 for engaging directly an input member with an output member of the torque converter 50. With the engine output shaft 52 is connected a shaft 59 passing through the turbine shaft 58. The shaft 59 drives an oil pump 90 disposed at a rear end portion of the transmission.

The gear mechanism 60 includes a Ravigneaux-type planetary gear mechanism 62 having a small sun gear 63 movably mounted on the turbine shaft 58, a large sun gear 64 disposed rearward of the small sun gear 63 and movably mounted on the turbine shaft 58, a plurality of short pinion gears 65 meshed with the small sun gear 63, a long pinion gear 66 meshed with the short pinion gears 65 at a front portion and with the large sun gear 64 at a rear end portion thereof, a carrier 67 rotatably carrying the short and long pinion gears 65 and 66, and a rig gear 68 meshed with the long pinion gear 66.

Between the turbine shaft 58 and the small sun gear 63 is disposed a forward clutch 70 for controlling a torque transmission to the small sun gear 63 through a first one-way clutch 72 and a coast clutch 71 for controlling the torque transmission between the turbine shaft 58 and the small sun gear 63 in a juxtaposed relationship. A 2-4 brake 73 having a brake drum 73a connected with the large sun gear 64 and a brake band 73b engaged with the brake drum 73a is disposed radially outward of the coast clutch 71. When the 2-4 brake 73 is engaged, the large sun gear 64 is fixed. A reverse clutch 74 for providing reverse running is disposed adjacent to the 2-4 brake 73 to control the torque transmission between the large sun gear 64 and the turbine shaft 58 through the brake drum 73a. Between the carrier 67 and the transmission casing 61 are disposed a second one-way clutch 76 and a low & reverse brake 75 for engaging and disengaging the carrier 67 and the transmission casing 61 in a juxtaposed relationship. Between the carrier 67 and the turbine shaft 58 is disposed a 3-4 clutch 77 for controlling the torque transmission between the carrier 67 and the turbine shaft 58.

In the illustrated embodiment, the gear mechanism 10 is provided with four shift gear stages in the forward direction and one shift gear stage in the reverse direction and selectively establishes one of the shift gear stages through operations of the clutches 70, 71, 74, 77 and brakes 73 and 75. In such a transmission, one power transmitting path is switched to another so that a desirable shift stage of a shift range can be established among a plurality of shift ranges, for example, four forward ranges.

Figure 2:
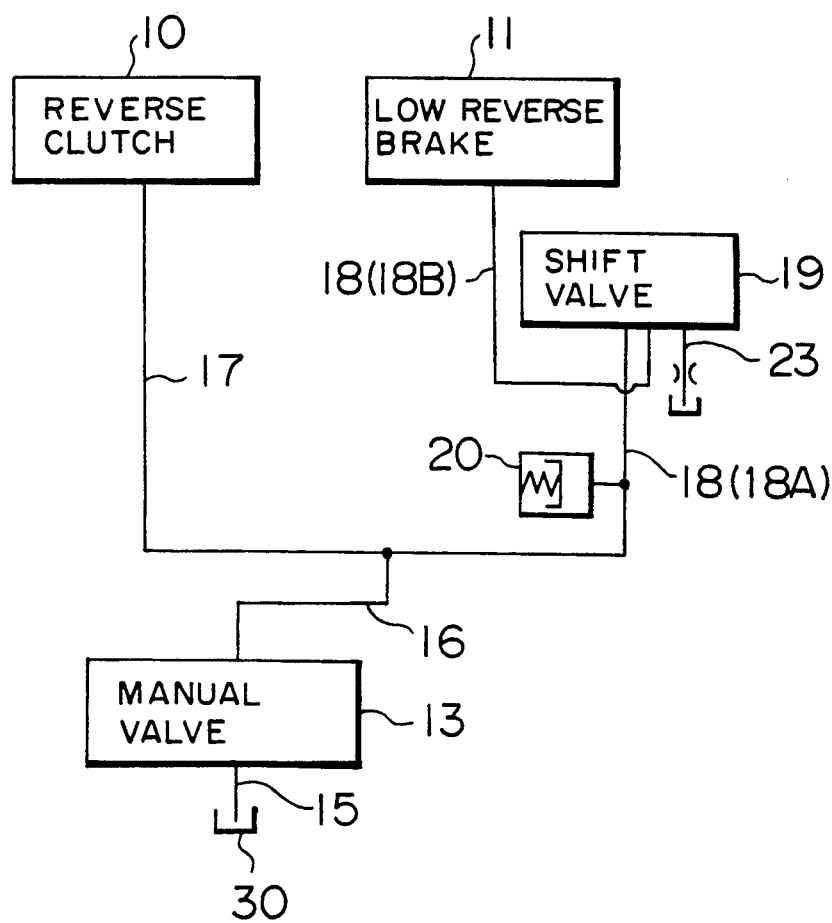
FIG. 2 is a schematic view of a part of a hydraulic control circuit for an automatic transmission to which the present invention can be applied.
Figure 3:
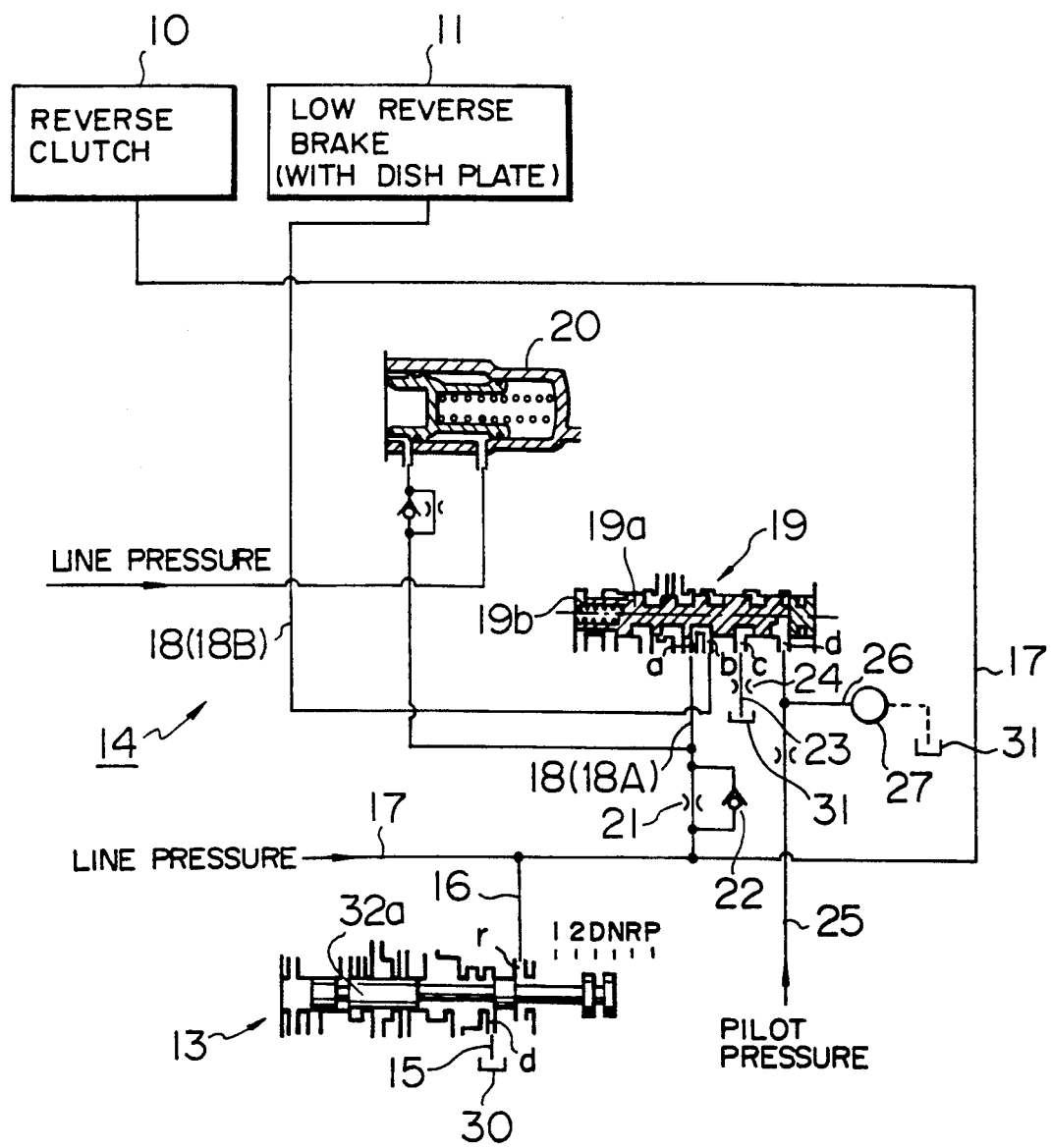
FIG. 3 is a part of the hydraulic circuit in accordance with the present invention.
Figure 5:
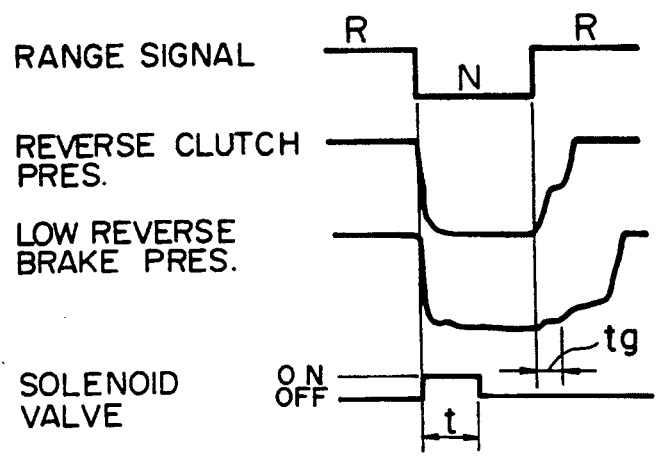
FIG. 5 is a time chart of variables involved in a shift change between R and N ranges.
Figure 6:
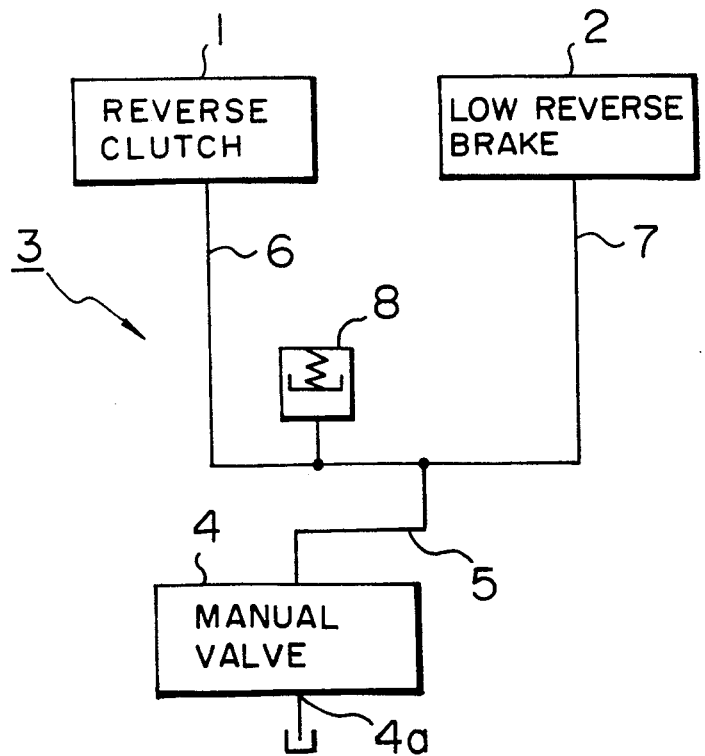
FIG. 6 is a schematic view of a part of a conventional hydraulic control circuit for an automatic transmission.

Referring to FIGS. 2 and 3, the reverse range can be obtained by making engagement of both reverse clutch 10 and low reverse brake 11. The low reverse brake 11 is provided with a dish plate for suppressing an abrupt increase of the hydraulic pressure in the low reverse brake 11 as disclosed in Japanese Patent Publication No. 57-52426. Numeral 13 in FIG. 3 designates manual valve which is provided with D, 2, 1 ranges for forward movement. When the D range is selected, 1st-4th stages can be obtained. The manual valve is also provided with N (neutral), R(reverse), and P(parking) ranges. When the R range is selected, both the reverse clutch 10 and the low reverse brake 11 are engaged.

Hereinafter, there will be explained a hydraulic circuit 14, referring to FIGS. 2 and 3.

The manual valve 13 is formed with ports r and d which are connected with main hydraulic line 16 and drain line 15, respectively. The main hydraulic line 16 is connected with line pressure supply line 17, which is divided into first hydraulic line 17 and second hydraulic line 18 located downstream of the connection between lines 16 and 17. The first hydraulic line 17 is connected with the reverse clutch 10 and the second hydraulic line 18 is connected with the low reverse brake 11. Shift valve 19 is disposed on the second hydraulic line 18 which is divided by the shift valve 19 into manual valve supply line 18A and low reverse brake supply line 18B. The manual valve supply line 18A is connected with port a of the shift valve 19. The low reverse brake supply line 18B is connected with port b of the shift valve 19. On the manual valve supply line 18A are disposed accumulator 20 and orifice 21. A bypass line bypassing the orifice 21 is connected with the line 18A. Check valve 22 is disposed on the bypass line.

The shift valve is further formed with ports c and d. The port c is connected with drain line 23 on which orifice 24 is disposed. The port d is connected with pilot line 25 which is connected with drain line 26 on which solenoid valve 27 is disposed.

A relationship between the ranges of the manual valve 13 and the operations of the reverse clutch 10 and the low reverse brake 11 is shown in FIG. 4. According to FIG. 4, when the R range is selected, the frictional elements or reverse clutch 10 and low reverse brake 11 are engaged. On the other hand, when the P, N and D ranges are selected, the elements 10 and 11 are released.

Engagement of the Elements 10, 11 (R Range)

The communication between the ports r and d is interrupted in the manual valve 13. The solenoid valve 27 is closed so that the pilot pressure is introduced into the shift valve 19, in which spool 19a is moved leftward against the resilient force of spring 19b. As a result, the port a is brought into communication with the port b.

Thus, the line pressure is introduced into the main hydraulic line 16 and directly to reverse clutch 10 through the first hydraulic line 17. The line pressure in the main hydraulic pressure line 16 is introduced into the second hydraulic line 18 and into the accumulator 20 to be accumulated. Thereafter, the hydraulic pressure is introduced into the low reverse brake 11 through the ports a and b of the shift valve 19. Accordingly, the reverse clutch 10 is engaged prior to the low reverse brake 11 so that an abrupt increase of the engaging force of the frictional elements 10 and 11 can be suppressed. Namely, the shift shock can be effectively prevented in shifting to the R range.

Release of the Frictional Elements 10, 11 (R Range to Another Range Such as N Range)

The port r is brought into communication with the port d in the manual valve 13. The solenoid 27 is opened so that the pilot pressure is drained. As a result, the spool 19a is moved rightward so that the port b is interrupted from communicating with the port a but communicated with the port c. Thus, the second hydraulic line 18 is divided by the shift valve 19 into the line 18A and line 18B.

The hydraulic pressure in the low reverse brake 11 is drained through the ports b and c of the shift valve 19 wherein the draining speed is controlled by the orifice 24. The hydraulic fluid in the accumulator 20 as well as that in the reverse clutch 10 is drained through the ports r and d of the manual valve 13. According to the above structure, relative draining speed between the reverse clutch 10 and the low reverse clutch 11 can be controlled by controlling a diameter of the orifice 24.

According to the present invention, when the R range is switched to another range, such as the N range, draining paths for the two frictional elements are established independently. As a result, it is easy to control the relative draining speed of the hydraulic fluid from the two frictional elements. Proper adjustment of the respective draining speeds for the two frictional elements enable preventing the shift shock in switching the R range to another range. As aforementioned, when the R range is established by switching from another range, the shift shock can be also obviated by virtue of the accumulator 20.

Hereinafter, there is described another embodiment of the present invention for reducing the shift shock from R to N range, referring to FIG. 4.

In this embodiment, when the manual valve 13 is switched from R to N range, the main hydraulic line 16 is communicated with oil tank 30 through the drain port d of the manual valve 13. Concurrently, the solenoid valve 27 is turned on to switch the spool 19a of the shift valve 19 to a position for draining as shown by upper half portion thereof in the drawing. As a result, downstream of the second hydraulic line 18, the low reverse brake 11 is communicated with oil tank 31 through the ports b and c of the shift valve 19. At an upstream location, the second hydraulic line 18 is closed by the shift valve 19 so that the hydraulic fluid in the accumulator 20 is drained into the oil tank through the manual valve 13. As a result, the hydraulic fluid in the low reverse brake 11 is gradually drained to the oil tank 31 through the shift valve, line 23 and orifice 24. This produces a gradual opening of the low reverse brake 11 on top of providing assistance the dish plate therein.

The hydraulic pressure in the reverse clutch 10 as well as that in the accumulator 20 is drained to the oil tank 30 of the oil tank 30 communicated with the manual valve 13. As a result, the hydraulic pressures of both the low reverse brake 11 and reverse clutch 10 are gradually reduced to release the brake 11 and clutch 10 so that the shift shock can be effectively prevented.

When a predetermined time period t after the manual valve 13 had been switched to N range, has passed the solenoid valve 27 is switched from ON to OFF. As a result, the spool 19a of the shift valve 19 is positioned as shown by a lower half portion of the drawing in FIG. 4 so that the shift valve communicates upstream with a downstream section of the second hydraulic line.

Thereafter, when the manual valve 13 is switched from the N to the R range, the hydraulic pressure is introduced into the main hydraulic line 16. In this case, it will be understood that the hydraulic pressure is immediately introduced into the low reverse brake 11 through the shift valve 19 and the accumulator 20 since the upstream part of the shift vale 19 has been already communicated with the downstream part of the shift valve 19 in the second hydraulic line 18. Accordingly, a time lag tg that is needed for moving the spool 19a to the predetermined position can be eliminated so that engaging pressure of the low reverse brake 11 can be promptly increased.

The shift valve 19 and the accumulator 20 can be disposed in the first hydraulic line 17 instead of the second hydraulic line 18.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A control system for an automatic transmission comprising:
    a main hydraulic line to which hydraulic pressure is introduced when a manual valve is used to select a reverse range for reverse movement,
    first and second hydraulic lines separated from the main hydraulic line,
    a first frictional element connected with the first hydraulic line,
    a second frictional element connected with the second hydraulic line,
    an accumulator disposed on the second hydraulic line,
    a shift valve disposed on the second hydraulic line closer to the second frictional element than the accumulator,
    a first drain port formed on the manual valve for draining hydraulic fluid from the main hydraulic line when the manual valve is shifted from the reverse range to another range,
    a spool movably disposed in the shift valve for moving to a position to shift the shift valve so that the second line is interrupted by the shift valve and divided between a second frictional element line and an accumulator line, and a second drain port formed in the shaft valve for draining the hydraulic fluid in the second frictional element line when the spool moves to the position in which the shift valve interrupts the second hydraulic line between the second frictional element line and the accumulator line, wherein, when a predetermined time period has passed after the manual valve has been switched to a neutral range, the shift valve is switched into a position for providing the reverse range.

2. A control system as recited in claim 1, wherein the predetermined time period is a time long enough to drain the hydraulic fluid in the second frictional element and the accumulator.

3. A control system as recited in claim 2, wherein the predetermined time period starts when the manual valve is switched from the reverse range to neutral range.

4. A control system as recited in claim 1, wherein the spool moves so as to switch the shift valve between a supply position in which the hydraulic pressure of the main hydraulic line is introduced into the second frictional element and a drain position in which the hydraulic fluid in the second frictional element is drained.

5. A control system as recited in claim 4, wherein the spool is controlled by means of a solenoid which controls a pilot pressure supplied to the shift valve.

6. A control system as recited in claim 3, wherein the hydraulic fluid in the first frictional element is drained through the manual valve.

7. A control system as recited in claim 3, wherein the hydraulic fluid in the accumulator is drained through the manual valve.

8. A control system as recited in claim 3, wherein the flow of hydraulic fluid the second frictional element is regulated by an orifice.

9. A control system as recited in claim 8, wherein the orifice is disposed in a drain line between the shift valve and a reservoir.

* * * * *